April 14, 1936.  A. P. BALL  2,037,301
FASTENER FOR TRIMMING MATERIAL
Filed Nov. 28, 1930  2 Sheets-Sheet 1
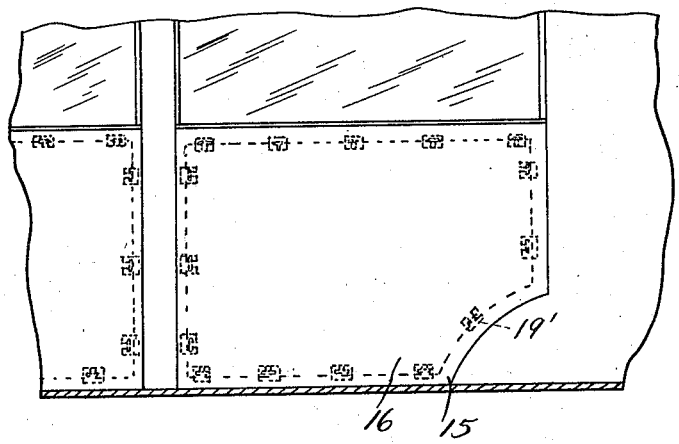
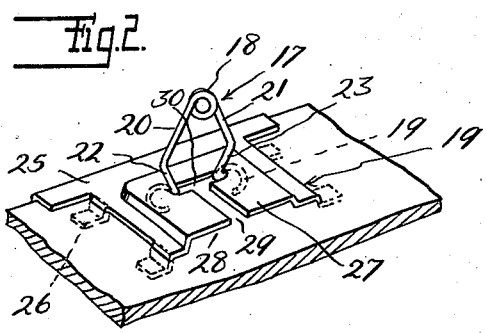
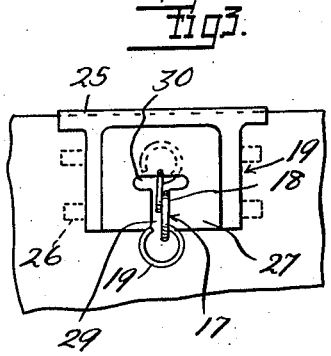
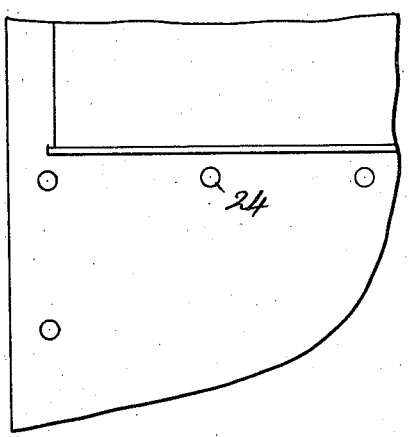
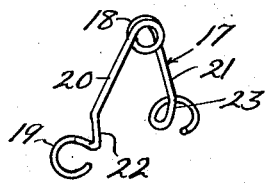
INVENTOR
Albert P. Ball
BY
ATTORNEYS April 14, 1936.    A. P. BALL    2,037,301
FASTENER FOR TRIMMING MATERIAL
Filed Nov. 28, 1930    2 Sheets-Sheet 2
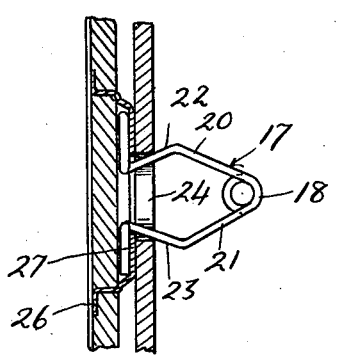
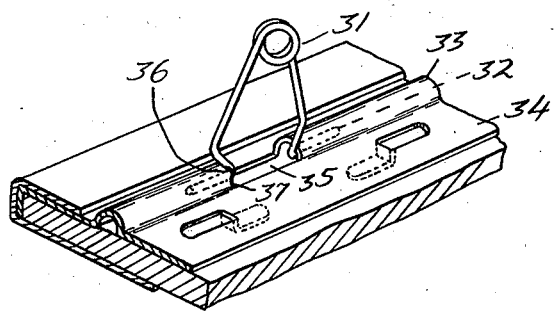
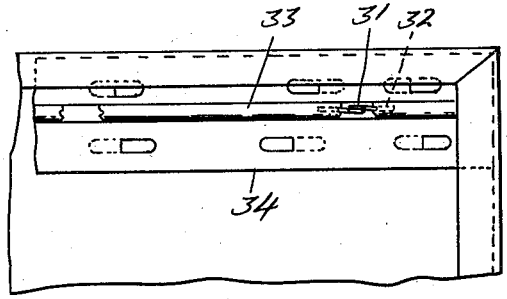
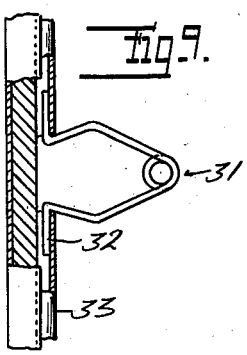
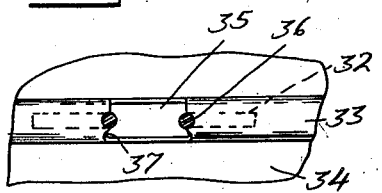
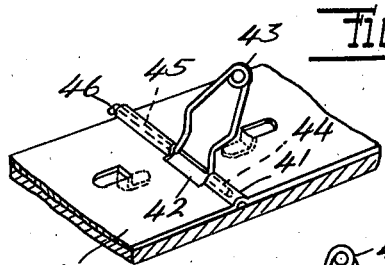
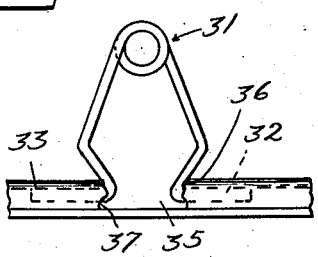
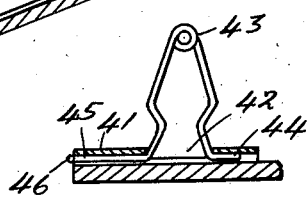
INVENTOR
Albert P. Ball
BY
ATTORNEYS Patented Apr. 14, 1936

2,037,301

UNITED STATES PATENT OFFICE 2,037,301

FASTENER FOR TRIMMING MATERIAL

Albert P. Ball, Detroit, Mich., assignor to Briggs Manufacturing Company, Detroit, Mich., a corporation of Michigan Application November 28, 1930, Serial No. 498,811

2 Claims. (Cl. 24—213)

This invention relates generally to fastener elements and more particularly to snap fastener devices especially designed for detachably securing trimming material panels to the frame work of vehicle bodies.

One of the primary objects of the present invention is to provide a fastener element of the type specified above which is extremely simple in construction and inexpensive to manufacture and one which may be readily assembled upon a strip of material.

Another object of this invention is to provide a fastener designed to secure materials in overlapping relation by a straight line insertion of the fastener into an opening formed in one of the materials.

Another object of this invention is to provide a fastener capable of efficient operation irrespective of variations in width of the material and the sizes of the opening into which the fastener is adapted to extend.

A further advantageous feature of this invention resides in the means employed for holding the fastener in operative position upon the material to be attached which means serves to hold the resilient portions of the fastener under tension.

Other objects of this invention will be made more apparent as this description proceeds, especially when considered in connection with the accompanying drawings, wherein:

Figure 1 is a side elevational view of a portion of a vehicle body having trimming material fastened thereto in accordance with the teachings of this invention;

Figure 2 is a fragmentary perspective view illustrating the backing for the trimming material and also the manner in which my improved fastener is secured in assembled relation with the backing;

Figure 3 is a plan view of the construction shown in Figure 2;

Figure 4 is a perspective view of the fastener;

Figure 5 is a side elevational view of a portion of the vehicle body frame work to which the fastener is adapted to be secured;

Figure 6 is a sectional view showing the trimming material in assembled relation with the vehicle body frame work;

Figure 7 is a view similar to Figure 2 showing a slightly modified form of construction;

Figure 8 is a side elevational view of the construction shown in Figure 7;

Figure 9 is a sectional view similar to Figure 6 illustrating the construction shown in Figure 7;

Figure 10 is a sectional plan view of the construction shown in Figure 7;

Figure 11 is a fragmentary side elevational view of a portion of the construction shown in Figure 7;

Figure 12 is a perspective view of still another modified form of construction; and Figure 13 is a sectional side elevational view of the construction shown in Figure 12.

While the fastener illustrated herein is capable of many and diversified uses, nevertheless, it finds particular utility when used in connection with vehicle body constructions for fastening the upholstery or trimming material in assembled relation with the frame work of the vehicle body. In Figure 1 of the drawings there is illustrated a portion of a vehicle body frame work 15 having a panel 16 of trimming material detachably secured thereto in accordance with the teachings of this invention.

The fastener 17 illustrated in Figures 2 to 4, inclusive, is formed of a single strip of wire bent intermediate the ends thereof to form a loop 18 and terminating at the free ends in laterally extending projections 19 adapted to be secured to a suitable backing 19' in a manner to be presently described. The looped intermediate portion 18 of the fastener forms the head of the latter and the ends of the loop form legs 20 and 21 which, as shown in Figure 2, are bowed outwardly intermediate the ends to form converging and diverging portions 22 and 23, respectively. The width of the bowed portion of the fastener is substantially greater than the diameter of the opening 24 in the framework 15 of the vehicle body so that when the fastener is in assembled relation with the framework, as shown in Figure 6, the latter will be securely but detachably held in place. In this connection it is to be noted that the converging portions 20 of the fastener serve to guide the latter into the opening 24, while the diverging portions 23 serve to hold the fastener from accidental disengagement from the framework aforesaid. It will also be understood from the preceding description that owing to the intermediate bowed portion 18, the fastener is inherently resilient and movement of the leg portions 20 and 21 of the fastener toward each other, upon insertion of the same within the opening 24, will be resisted with the result that as soon as the portion of greatest width of the fastener assumes a position beyond the opening, the leg portions immediately move outwardly to the position shown in Figure 6 wherein the fastener is yieldably maintained within the opening 24. It will further be apparent from the above description that insertion of the fastener within the opening 24 may be accomplished by a simple straight line movement thereof.

The fastener 17, described above, is removably secured to the outside face of the backing by means of the retainer plate 25 having lugs 26 struck out therefrom and crimped over the inner face of the backing for rigidly securing the retainer plate to the latter. The intermediate portion 27 of the retainer plate is pressed laterally outwardly from the adjacent face of the backing plate to form with the latter a recess 28 for receiving the attaching portions 19 on the fastener element 17. The width of the recess 28 is slightly less than the width of the attaching portions of the fastener element with the result that when the attaching portions 19 are in assembled relation with the retainer plate as shown in Figure 2, the leg portions 20 and 21 of the fastener element will be held under a slight tension by the retainer plate. In order to prevent accidental disengagement of the fastener element from the backing, the portion 27 of the retainer plate is provided with a first slot 29 open at one end and terminating at the opposite end in a transversely extending second slot 30 having a length substantially less than the distance between the inner ends of the diverging portions 23 of the fastener element, the two slots together forming a T-shaped slot in plate 25. The width of the slot 29 is substantially less than the distance between the inner ends of the diverging portions with the result that when the fastener element is in the position shown in Figure 2, movement of the fastener element relative to the retainer plate is restricted by the opposed walls of the transversely extending slot 30. The sides of slot 30 are straight over a substantial portion of the length thereof, forming corners at the junction of the stem and head portions of the T-shaped slot and defining shoulders in slot 30 adjacent the corners. When it is desired to remove the fastener element from the retainer plate, it is necessary to compress the leg portions 20 and 21 of the element sufficiently to position one of the leg portions opposite the slot 29 at which time the pressure upon the leg portions may be relieved causing the leg portion aforesaid to move longitudinally of the slot and permitting the fastener to be rotated to the position shown in Figure 3 at which time the same may be moved longitudinally of the slot 29 out of engagement with the retainer plate. On the other hand, when it is desired to assemble the fastener element with the retainer plate, one leg of the former is moved longitudinally of the slot 29 into engagement with one end wall of the transverse slot 30 at which time the legs of the fastener element may be compressed to move the other leg of the element longitudinally of the slot 29 into engagement with the opposite end of the transverse slot 30.

The fastener element 31 illustrated in Figure 7 of the drawings is identical in construction to the fastener element 17, hereinbefore set forth, with the exception that the attaching portions 32 extend laterally in substantially the plane of the fastener and engage within a longitudinally extending rib 33 formed in the retainer strip 34 which is secured to the backing in a manner similar to the retaining plate 25 described above. As shown in Figures 7 to 11, inclusive, the rib 33 is cut away to form a slot 35 through which the legs of the fastener 31 are adapted to project. The length of the slot 35 is slightly less than the distance between the inner ends of the diverging portions of the fastener element and the opposite walls of the slot are recessed as at 36 for receiving the inner end portions of the legs to position the fastener element in operative relation as shown in Figure 7. If desired, the opposite ends of the slot 35 may be provided with recesses 37 adjacent the recesses 36 and so arranged as to maintain the fastener element in a substantially flat position against the outer face of the backing as shown in Figure 11. This latter arrangement is advantageous when the backing, having the fastener elements attached thereto, is transported from one point to another. Assuming that the fastener elements are in the position shown in Figure 11 and it is desired to assemble the backing upon the frame structure, the element is merely rotated from the position shown in Figure 11 to the position shown in Figure 7. The construction is such that movement of the inner end portions of the fastener elements out of the recesses 37 causes the leg portion of the fastener element to compress slightly with the result that when the fastener element assumes its operative position, the leg portions will snap into engagement with the recesses 36.

The modification illustrated in Figure 12 is similar in construction to the modification illustrated in Figures 7 to 11, inclusive, in that the retainer plate 40 is provided with a rib 41 having a slot 42 of predetermined length intermediate the ends thereof for receiving the fastener element 43. The fastener element 43 is also similar in construction to the fastener elements hereinbefore set forth with the exception that the attaching portions 44 and 45 are of different lengths. As shown in Figure 12, the attaching portion 45 extends beyond one end of the rib 41 and is bent laterally as shown at 46 to prevent disengagement of the fastener element from the rib. The attaching portion 44, on the other hand, is considerably shorter than the attaching portion 45 and may be removed from the rib 41 by compressing the leg portions of the fastener element. In assembling the fastener element 43 with the retainer plate, it will be apparent that the attaching portion 45 is inserted within the rib through the slot 42 and then crimped as specified above. After this operation has been completed, the leg portions of the fastener element are compressed sufficiently to permit the shorter attaching portion 44 to engage within the rib 41 as shown in Figure 12. It is to be understood that the length of the slot 42 is slightly less than the distance between the inner ends of the leg portions of the fastener element with the result that the leg portions of the latter will be yieldably urged into engagement with opposite walls of the slot.

What I claim as my invention is:

1. Means for detachably securing two members together comprising a fastener element having flexible leg portions insertable through an opening in one of said members and engageable with the side walls of the opening to yieldably maintain the element in assembled relation with said member, oppositely projecting lateral extensions upon the ends of said leg portions free from connection with each other to permit readily compressing the leg portions, means for detachably securing the fastener element to another of said members comprising a retainer plate fixed to the second named member with a portion thereof spaced laterally from the adjacent face of said latter member to provide a recess for receiving said extensions and having a first slot, one end thereof terminating at one edge of the plate, and being extended transversely from both sides thereof at its opposite end to form a second slot, said second slot having straight sides extending over a substantial portion of the length thereof forming with said first slot angular corners, said straight sides defining shoulders adjacent said corners, said second slot being of a length less than the normal distance between the ends of the leg portions for maintaining the latter under tension, said shoulders confining said fastener to prevent rotation and removal thereof except when said legs are compressed to clear said shoullders.

2. A fastener for detachably securing a pair of members together comprising a fastener element having diverging leg portions terminating in converging portions connected together at the point of convergency, said converging portions insertable within an opening formed in one of the members to guide the diverging portions into engagement with the side walls of the opening to maintain the fastener element in assembled relation with said member, oppositely extending projections at the extremities of the diverging portions free from connection with each other to permit readily compressing the leg portions, means for detachably securing the fastener element to another of said members comprising a retainer plate fixed to the second named member with a portion thereof spaced laterally from the adjacent face of said second member to provide a recess for receiving the extensions aforesaid and having a T-shaped slot therein, one end of the stem portion of the slot terminating at one edge of the plate and its other end communicating with the head portion of the slot, the head portion of the slot having straight sides extending over a substantial portion of the length thereof and forming with the stem of the slot angular corners, said straight sides defining shoulders adjacent said corners, said head portion being of a length less than the normal distance between the ends of the leg portions for maintaining the latter under tension, said shoulders confining said fastener to prevent rotation and removal thereof except when said legs are compressed to clear said shoulders.

ALBERT P. BALL.